(12) United States Patent
Okada (10) Patent No.: US 8,274,538 B2
(45) Date of Patent: Sep. 25, 2012

(54) OPTICAL SCANNER, IMAGE FORMING APPARATUS, AND IMAGE FORMING METHOD

(75) Inventor: Masanori Okada, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 508 days.

(21) Appl. No.: 12/360,925

(22) Filed: Jan. 28, 2009

(65) Prior Publication Data

US 2009/0190944 A1    Jul. 30, 2009

(30) Foreign Application Priority Data

Jan. 29, 2008   (JP) .................. 2008-017709

(51) Int. Cl.
*B41J 2/435* (2006.01)
*B41J 2/48* (2006.01)
*G01D 15/14* (2006.01)

(52) U.S. Cl. ......... 347/236; 347/231; 347/234; 347/235

(58) Field of Classification Search ................... 347/236
See application file for complete search history.

(56) References Cited

U.S. PATENT DOCUMENTS

| 5,892,219 | A | * | 4/1999 | Minakuchi et al. | 250/205 |
| 5,959,655 | A | * | 9/1999 | Maruo et al. | 347/246 |
| 5,986,687 | A | * | 11/1999 | Hori | 347/246 |
| 6,078,347 | A | * | 6/2000 | Nukui | 347/246 |
| 2005/0212901 | A1 | * | 9/2005 | Sobue et al. | 347/246 |
| 2006/0256182 | A1 | * | 11/2006 | Takahashi | 347/229 |
| 2007/0195156 | A1 | * | 8/2007 | Kubo | 347/238 |
| 2007/0242128 | A1 | * | 10/2007 | Sobue | 347/253 |
| 2007/0285677 | A1 | * | 12/2007 | Maeda | 358/1.1 |

FOREIGN PATENT DOCUMENTS

JP   2005-319732 A   11/2005

* cited by examiner

*Primary Examiner* — Laura Martin
*Assistant Examiner* — Jeremy Bishop
(74) *Attorney, Agent, or Firm* — Smith, Gambrell & Russell, LLP (57) ABSTRACT

The emission intensity of a laser beam source, at a time when a laser beam emitted from the laser beam source and scanned by an optical scanning device becomes incident to a laser beam detector provided in a predetermined position on the scanning path of the laser beam in order to hold a position of an electrostatic latent image formed on a photoreceptor constant in the main scanning direction, while at the same time, changing the emission intensity of the laser beam, is set so as to become the consistently same emission intensity regardless of a change in emission intensity at the time of electrostatic latent image formation onto a photoreceptor. This allows the detection timing of a laser beam by a laser beam detector to be kept constant.

6 Claims, 4 Drawing Sheets

OPTICAL SCANNER, IMAGE FORMING APPARATUS, AND IMAGE FORMING METHOD

CROSS-REFERENCE TO PRIOR APPLICATION

The present application claims priority from Japanese Patent Application No. 2008-017709, filed on Jan. 29, 2008, and is hereby incorporated by reference in its entirety herein.

BACKGROUND OF THE INVENTION

1. Field of the Invention

The present invention relates to an optical scanner for forming an electrostatic latent image on a photoreceptor by scanning a laser beam, that is emitted on the basis of image data, onto the photoreceptor, and an image forming apparatus comprising thereof, and more particularly, to a technology for holding a position for image formation of the electrostatic latent image constant in the main scanning direction on the photoreceptor.

2. Description of the Related Art

Conventionally, there have been image forming apparatuses, such as copiers, printers, facsimiles, and MFPs comprising thereof, which form a color image by overlapping toner images of four colors: magenta (M), cyan (C), yellow (Y), and black (K), and transferring the color image onto a recording paper. An image forming unit in the above color image forming apparatuses is provided with a plurality of optical scanners for scanning a laser beam emitted on the basis of image data of each color onto a plurality of photoreceptor drums that are arranged so as to correspond to each color, so that an electrostatic latent image is formed on the photoreceptor drums.

Figure 3:
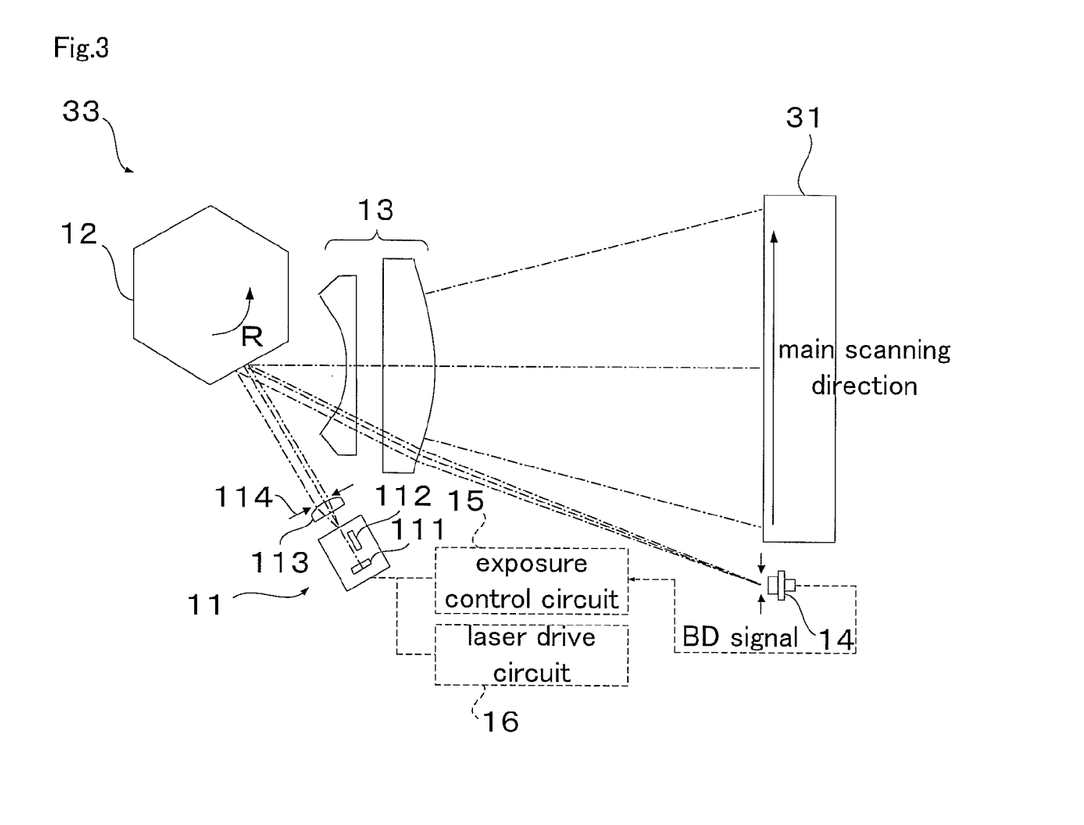
FIG. 3 is a pattern diagram showing a general configuration of an optical scanner according to one embodiment of the present invention.

Here, FIG. 3 shows a schematic configuration diagram of an optical scanner 33 according to the later-described embodiment of the present invention.

In the optical scanner 33 shown in FIG. 3, a laser beam emitted from a laser beam source 11 and scanned by a polygon mirror 12 is detected by a laser sensor 14 disposed on a scanning path of the laser beam, so as to start writing an electrostatic latent image onto a photoreceptor drum 31. In short, the optical scanner 33 decides the position of the electrostatic latent image in the main scanning direction on the photoreceptor drum 31 depending on a detection timing of the laser beam by the laser sensor 14. Such a configuration has been disclosed in, for example, Japanese Unexamined Patent Publication No. 2005-319732.

Figure 5:
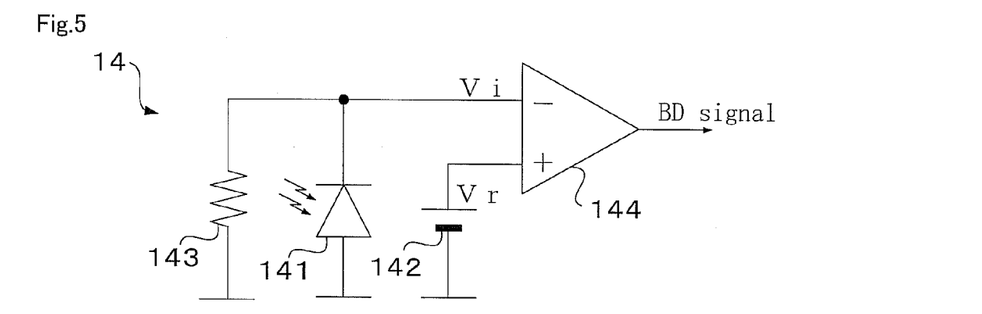
FIG. 5 is a circuit diagram of a laser sensor provided in an optical scanner according to one embodiment of the present invention.
Figure 6:
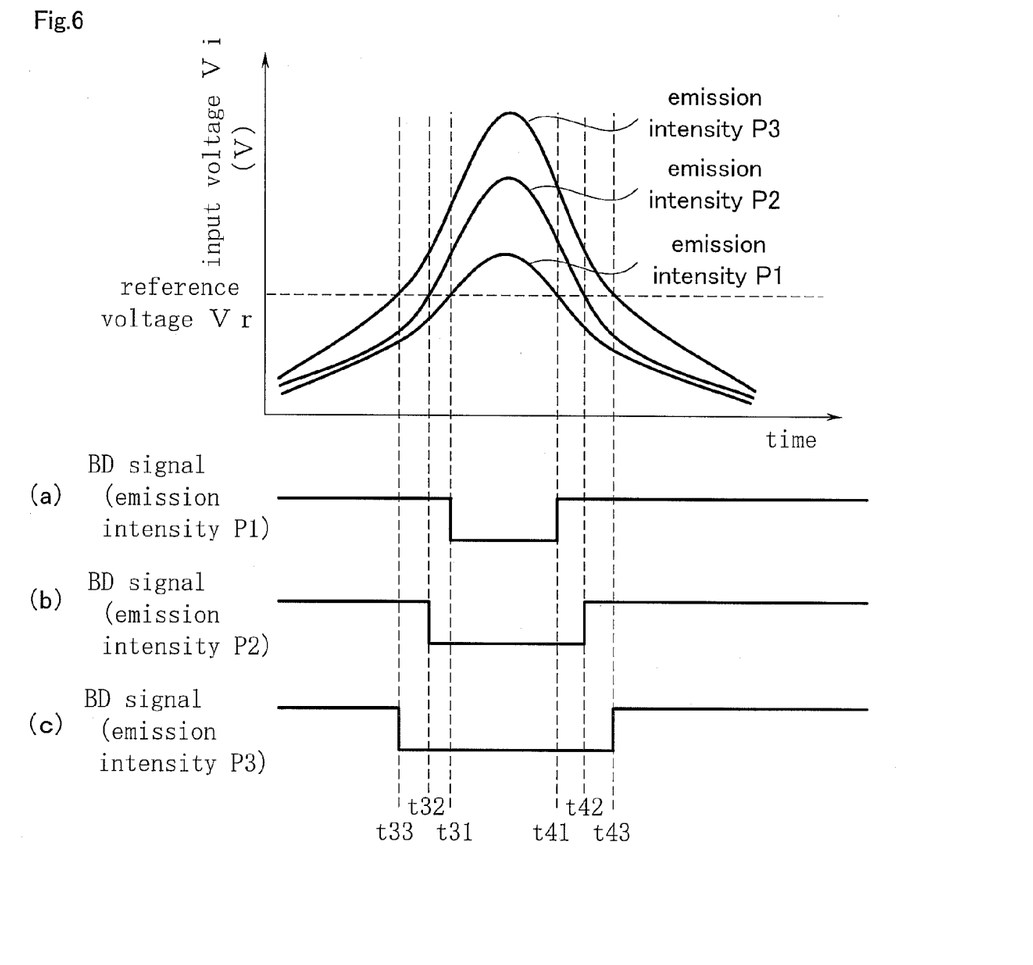
FIG. 6 shows one example of operation characteristics of a laser sensor provided in an optical scanner according to one embodiment of the present invention.

Here, as referring to FIGS. 5 and 6, one example of the laser sensor 14 is explained in details.

As illustrated in FIG. 5, the laser sensor 14 has such as a photodiode 141, an internal power source 142, a resistance 143, and a comparator 144.

The internal power source 142 converts the voltage applied from a power source not shown into a reference voltage Vr to input it into the comparator 144. The reference voltage Vr is a predetermined value for detecting that a laser beam is incident to the laser sensor 14.

On the other hand, in the laser sensor 14, when a laser beam emitted from the laser beam source 11 becomes incident to the photodiode 141, an input voltage Vi produced by the resistance 143 and the photodiode 141 is inputted into the comparator 144. In this moment, the input voltage Vi changes in accordance with the emission intensity of the laser beam incident to the photodiode 141.

And then, the comparator 144 compares the input voltage Vi from the photodiode 141 with the reference voltage Vr from the internal power source 142, and when the input voltage Vi reaches the reference voltage Vr or higher, outputs a laser beam detection signal (hereinafter referred to as "BD signal") indicating that the laser beam has been detected.

In the laser sensor 14, the point of time when the input voltage Vi reaches the reference voltage Vr or higher changes in accordance with the emission intensity of a laser beam emitted from the laser beam source 11. Here, FIGS. 6(a) to (c) indicate the BD signals output from the laser sensor 14 in the case where the emission intensities of the laser beam source 11 are P1, P2 and P3. The emission intensities P1, P2 and P3 are: the emission intensity P1<the emission intensity P2<the emission intensity P3.

As illustrated in FIG. 6, the higher the emission intensity of the laser beam source 11 is, the higher the peak value of the input voltage Vi of the laser sensor 14 reaches, and thus, the point of time when the input voltage Vi reaches the reference voltage Vr comes earlier. Therefore, the output timings (t31, t32, and t33) of the BD signal from the laser sensor 14 therefore come earlier. In addition, the higher the emission intensity of the laser beam source 11 is, the longer the time interval during which the input voltage Vi is reaching the reference voltage Vr extends. The stop timings (t41, t42, and t43) of the BD signal output from the laser sensor 14 therefore delay.

As mentioned, in the optical scanner 33, when the emission intensity of the laser beam emitted from the laser beam source 11 changes, the output timing or the stop timing of the BD signal from the laser sensor 14 also changes. This means, the writing timing of an electrostatic latent image controlled on the basis of the BD signal also changes.

On the other hand, in the image forming apparatus, when, for example, printing conditions such as resolution of image formation and printing speed are changed, the emission intensity of the laser beam source 11 in the optical scanner 33 is sometimes changed in accordance with the changed printing conditions. In particular, when the printing speed becomes slower, the emission intensity of the laser beam source 11 is changed to be lower.

However, as mentioned above, the change in the emission intensity of the laser beam source 11 changes the output timing and the stop timing of the BD signal from the laser sensor 14. This means, the writing timing of en electrostatic latent image of the optical scanner 33 also changes. This causes a problem that the position in the main scanning direction of a electrostatic latent image to be formed on the photoreceptor drum 31 cannot be determined.

Particularly, in an image forming apparatus dealing with colors and comprising a plurality of the optical scanners 33, when the emission intensity of the laser beam source 11 is changed for each optical scanner 33 dealing with each color, a position of image formation of an electrostatic latent image by each the optical scanner 33 is misaligned in the main scanning direction on the photoreceptor drum 31. Therefore, a color deviation may occur in a color image formed when images developed on each photoreceptor drum 31 are overlapped.

The present invention has been developed on the basis of the above circumstances, with an object of providing an optical scanner, an image forming apparatus, and image forming method that allow the emission intensity of a laser beam to be changed, while at the same time, holding a position of an electrostatic latent image formed on a photoreceptor constant in the main scanning direction.

SUMMARY OF THE INVENTION

To achieve these objects, the present invention provides an optical scanner comprising: a laser beam source for emitting a laser beam, an optical scanning device for scanning a laser beam emitted from the laser beam source, an exposure controller for forming an electrostatic latent image corresponding to image data on a photoreceptor by controlling the existence of light emission of the laser beam source on the basis of the image data, a laser beam detector which is provided in a predetermined position on a scanning path of a laser beam of the optical scanning device and detects an incidence of a laser beam having an emission intensity equal to or higher than a predetermined reference emission intensity, a timing controller for exposure start for controlling a start timing of image formation of an electrostatic latent image by the exposure controller on the basis of a timing at which the laser beam is detected by the laser beam detector, an exposure intensity changing unit for changing an emission intensity of the laser beam source at the time of image formation of an electrostatic latent image of the exposure controller, and a setting unit for emission intensity at detection for setting every emission intensity of the laser beam source at when a laser beam detected by the laser beam detector to a predetermined emission intensity.

According to the present invention, a timing when the incidence of a laser beam having an emission intensity equal to or higher than the reference emission intensity is detected by the laser beam detector, in short, a start timing of the electrostatic latent image formation controlled by the timing controller for exposure start, can be kept constant, and thus, a position of the electrostatic latent image in the main scanning direction on the photoreceptor can be kept constant.

Particularly, in an image forming apparatus dealing with colors and comprising a plurality of optical scanners according to the present invention, the position of image formation of an electrostatic latent image by each of the optical scanners are constant in the main scanning direction on the photoreceptor, even when the emission intensity of the laser beam source is changed for every optical scanner. This prevents the occurrence of the color deviation in a color image produced by overlapping images formed on respective photoreceptors.

There may be a configuration further comprising an automatic emission intensity adjusting unit such as a so-called APC circuit for automatically adjusting the emission intensity of the laser beam source to a preset automatically-adjusted emission intensity. In this case, the exposure intensity changing unit may change the emission intensity of the laser beam source at the time of electrostatic latent image formation by the exposure controller, by changing a setting value of the automatically-adjusted emission intensity of the automatic emission intensity adjusting unit.

In this moment, the setting unit for emission intensity at detection changes an emission intensity of the laser beam source to the emission intensity at detection after the end of adjustment by the automatic emission intensity adjusting unit. And according to the laser beam detection by the laser beam detector, the exposure controller starts the electrostatic latent image formation, the setting unit for emission intensity at detection changes the emission intensity of the laser beam source to the automatically-adjusted emission intensity adjusted by the automatic emission intensity adjusting unit.

Additionally, the present invention may be understood as an invention of an image forming apparatus comprising one or a plurality of the optical scanners. An image forming apparatus comprising the optical scanner can hold a position in the main scanning direction of an image to be formed on a paper sheet constant, while at the same time, preventing the occurrence of color deviation in a color image.

And also, the present invention may be regarded as an image forming method employing the optical scanner. In short, the present invention can be regarded as an image forming method employing an optical scanner comprising: a laser beam source for emitting a laser beam, an optical scanning device for scanning a laser beam emitted from the later beam source, an exposure controller for forming an electrostatic latent image corresponding to image data on a photoreceptor by controlling the existence of light emission of laser beam from the laser beam source on the basis of the image data, a laser beam detector that is provided in a predetermined position on a scanning path of a laser beam of the optical scanner and detects the incidence of a laser beam having an emission intensity equal to or higher than a predetermined reference emission intensity, a timing controller for exposure start for controlling a start timing of the electrostatic latent image formation by the exposure controller on the basis of a detected timing at which the laser beam is detected by the laser beam detector, and an exposure intensity changing unit for changing the emission intensity of the laser beam source at the time of the electrostatic latent image formation by the exposure controller, and also regarded as an image forming method characterized by setting every emission intensity of the laser beam source at the time of detection of the laser beam by the laser beam detector to a predetermined emission intensity.

DETAILED DESCRIPTION OF THE PREFERRED EMBODIMENTS

In what follows, the embodiment of the present invention is described with reference to the accompanying drawings to provide more understanding of the present invention. Additionally, the following embodiment is merely an example of the present invention, having no intention to limit the technical scope of the present invention.

Figure 1:
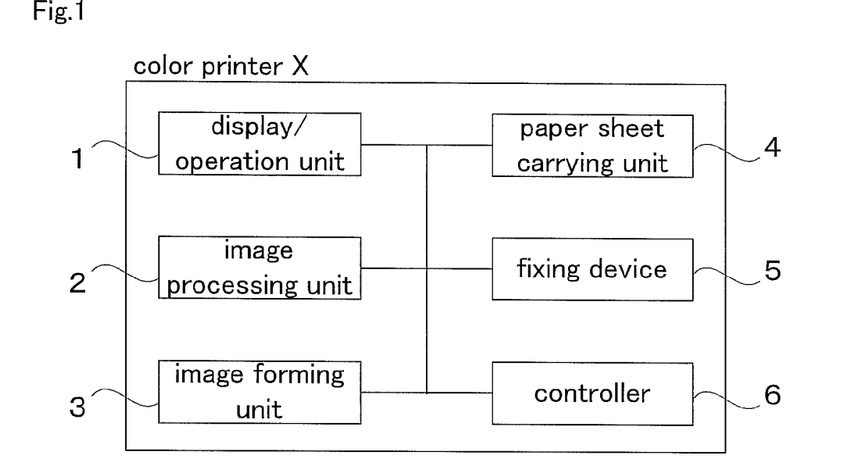
FIG. 1 is a block diagram showing a general configuration of a color printer according to one embodiment of the present invention.
Figure 2:
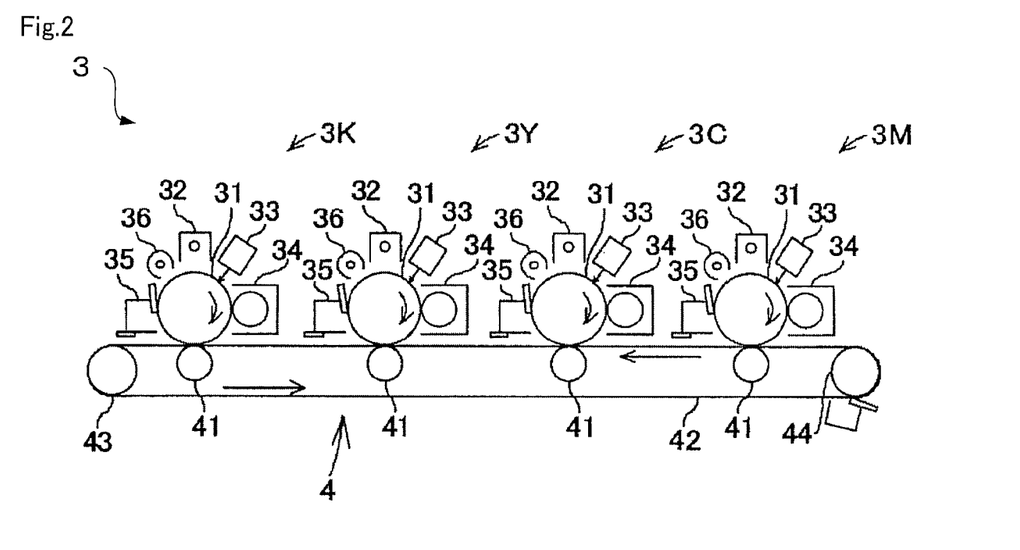
FIG. 2 is a schematic configuration diagram of an image forming unit in a color printer according to one embodiment of the present invention.
Figure 4:
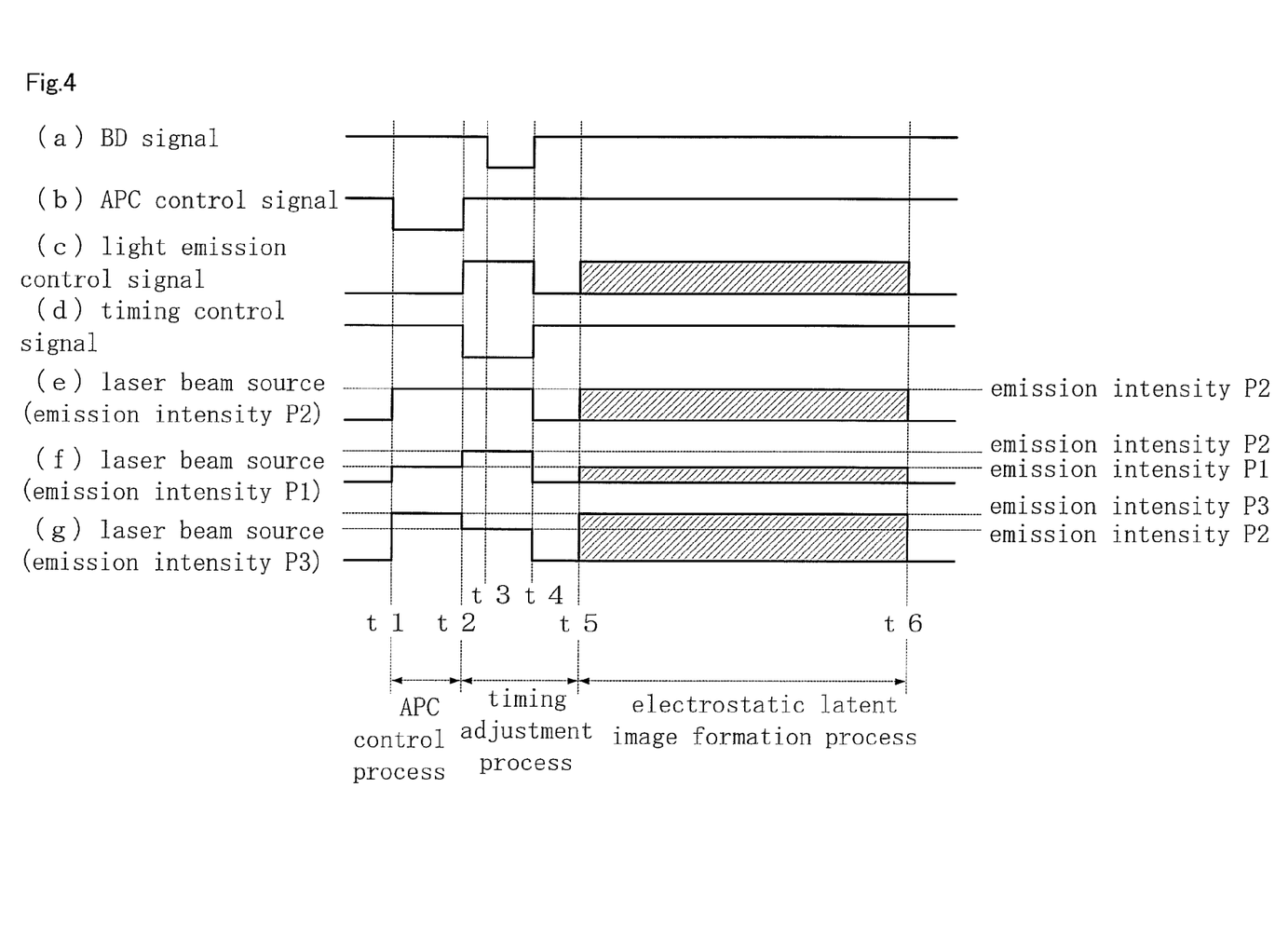
FIG. 4 is a timing chart for explaining exposure processing in every line by an optical scanner according to one embodiment of the present invention.

Here, FIG. 1 is a block diagram showing a general configuration of a color printer X according to one embodiment of the present invention; FIG. 2 is a schematic configuration diagram of an image forming unit 3 in the color printer X; FIG. 3 is a pattern diagram showing a general configuration of an optical scanner 33 provided in the image forming unit 3; FIG. 4 is a timing chart for explaining exposure processing in every line by the optical scanner 33; FIG. 5 is a circuit diagram of a laser sensor 14, and FIG. 6 shows one example of operation characteristics of the laser sensor 14.

In addition, the color printer X according to the present embodiment is merely an example of an image forming apparatus according to the present invention, and copiers, facsimiles, and MFPs are also regarded as image forming apparatuses according to the present invention. Here is described an image forming apparatus dealing with colors and having a plurality of the later-described optical scanners 33 according to the embodiment of the present invention. However, the image forming apparatus may also be for monochrome, having only one optical scanner 33.

Firstly, as referring to FIG. 1, a general configuration of the color printer X according to the embodiment of the present invention is described.

As shown in FIG. 1, the color printer X has: a display/operation unit 1 such as a liquid crystal display and a touch panel for displaying various information and conducting inputting operation in the color printer X, an image processing unit 2 for providing various image processing to image data of manuscripts input from a data processing device that is outside of the figure and connected via a communication network such as LAN, an image forming unit 3 for forming a toner image (developer image) on a paper sheet on the basis of the image data of manuscripts input from the image processing unit 2, a paper sheet carrying unit 4 for delivering a paper sheet to the image forming unit 3, a fixing device 5 for melt-fixing the toner image formed on the paper sheet by the image forming unit 3 onto the paper sheet, and a controller 6 for integrally controlling the color printer X. The controller 6 comprises a CPU, a ROM and a RAM as a calculating means, and the CPU conducts various processing in accordance with a prescribed control program stored in the ROM.

Here, the image forming unit 3 and the paper sheet carrying unit 4 are described in reference to FIG. 2.

As shown in FIG. 2, the image forming unit 3 has a plurality of image forming units 3M, 3C, 3Y, and 3K respectively corresponding to colors: magenta (M), cyan (C), yellow (Y), and black (K). On the other hand, the paper sheet carrying unit 4 comprises a plurality of carrying rollers 41, a carrying belt 42, a driving roller 43 and a stretching roller 44, and carries a paper sheet sequentially to the image forming units 3M, 3C, 3Y, and 3K by driving the driving roller 43 to run the carrying belt 42.

Each of the image forming units 3M, 3C, 3Y, and 3K is constituted in nearly-the same configuration, and comprises such as a photoreceptor drum 31, charger 32, an optical scanner 33, a developing device 34, a cleaner 35 and a discharger 36.

In each of the image forming units 3M, 3C, 3Y, and 3K constituted as mentioned above, a laser beam based on image data is emitted by the optical scanner 33 onto the surface of the photoreceptor drum 31 that is uniformly charged by the charger 32, so as to form an electrostatic latent image. After that, the electrostatic latent image is developed by the developing device 34 as a toner image.

Toner images formed on the photoreceptor drums 31 in each of the image forming units 3M, 3C, 3Y, and 3K are then sequentially overlapped one after another and transferred to the paper sheet carried by the paper sheet carrying unit 4, so that a color image is formed on the paper sheet. Additionally, the toner on the photoreceptor drum 31 left without being transferred to the paper sheet is cleared away by the cleaner 35. After that, the photoreceptor drum 31 is discharged by the discharger 36.

Next, in reference to the pattern diagram in FIG. 3, the optical scanner 33 is described. Here, FIG. 3 is a pattern diagram of the optical scanner 33 viewed from the above.

As shown in FIG. 3, provided in the optical scanner 33 are: a laser beam source 11 for emitting a laser beam, a polygon mirror 12 (one example of a rotating polygon mirror and an optical scanning device) for scanning in the main scanning direction (the vertical direction in FIG. 3) the laser beam emitted from the laser beam source 11, a f-θ lens 13 for forming an image on the surface of the photoreceptor drum 31 with a laser beam scanned by the polygon mirror 12, and a laser sensor 14 (one example of a laser beam detector) provided in a predetermined position on a scanning path of a laser beam from the polygon mirror 12.

Also, the optical scanner 33 has an exposure control circuit 15 (one example of an exposure controller) for forming an electrostatic latent image corresponding to an image data on the photoreceptor drum 31 by controlling the existence of light emission of a laser beam from the laser beam source on the basis of the input image data, and a laser drive circuit 16 for controlling the drive of the laser beam source 11. In addition, the exposure control circuit 15 and the laser drive circuit 16 can be regarded as one electrical circuit. And also, instead of these circuits, a calculation device such as MPU may be provided for embodying similar processing functions by performing processing in accordance with a prescribed control program.

Provided in the laser beam source 11 are: a laser diode 111 for emitting a laser beam at an emission intensity corresponding to the electrical power to be supplied, a photodiode 112 for detecting an emission intensity of a laser beam emitted from the laser diode 111, a collimator lens 113 for outputting a laser beam emitted from the laser diode 111 as a parallel light having a prescribed width, and a diaphragm 114.

The polygon mirror 12 scans a laser beam emitted from the laser beam source 11 on a prescribed scanning path by being rotated in a direction of an arrow R by a motor not shown. In general, the scanning direction of a laser beam by the polygon mirror 12 is called as a main scanning direction. The polygon mirror 12 shown in FIG. 3 has a shape of regular hexagon, however, it may have other shapes of regular polygon.

As illustrated in FIG. 5, the laser sensor 14 has such as a photodiode 141, an internal power source 142, a resistance 143, a comparator 144. When an input voltage Vi from the photodiode 141 reaches a reference voltage Vr or more from the internal power source 142, the laser sensor 14 detects the incidence of a laser beam having an emission intensity equal to or higher than a preset emission intensity from the polygon mirror 12, so as to produce a laser beam detection signal (hereinafter referred to as "BD signal") indicating the above incidence and output the signal to the exposure control circuit 15.

The exposure control circuit 15 controls a writing timing of an electrostatic latent image in the main scanning direction onto the photoreceptor drum 31 in response to the BD signal input from the laser sensor 14. Here, the exposure control circuit 15 at the time of performing this control corresponds to a timing controller for exposure start.

In short, in the optical scanner 33, a position in the main scanning direction of an electrostatic latent image formed on the photoreceptor drum 31 is decided depending on a timing of the BD signal output from the laser sensor 14.

The laser drive circuit 16 controls the existence of electrical current to the laser diode 111 as well as the magnitude of the electrical current flowing into the laser diode 111, on the basis of instructions from the exposure control circuit 15.

In concrete, the laser drive circuit 16 has a APC function for performing a so-called APC (Automatic Power Control) control that, when an APC control signal is input from the exposure control circuit 15, automatically adjusts an emission intensity of a laser beam emitted from the laser beam source 11 to a preset automatically-adjusted emission intensity (hereinafter referred to as "APC intensity"). Here, the laser drive circuit 16 at the time of embodying this APC function corresponds to an automatic emission intensity adjusting unit.

In the APC control, the magnitude of electrical current to be supplied to the laser diode 111 is adjusted so that, while a constant voltage being applied to the laser diode 111 so as to emit a light, the emission intensity detected by the photodiode 112 settles to the APC intensity. More particularly, the adjustment is conducted so that the output voltage from the photodiode 112 is settled to a voltage responding to the APC intensity.

Also, the laser drive circuit 16 controls the existence of electrical current to the laser diode 111 in the laser beam source, in short, controls the existence of the light emission of the laser diode 111, in accordance with ON/OFF of a light emission control signal input from the exposure control circuit 15.

Here, the laser drive circuit 16 allows the light emission of the laser beam source 11 at the APC intensity when only the light emission control signal is input from the exposure control circuit 15. However, when a timing control signal along with the light emission control signal are input, the laser drive circuit 16 starts light emission of the laser beam source 11 at a predetermined and constant emission intensity (hereinafter referred to as "emission intensity at detection") regardless of a setting value of the APC intensity. In short, in the optical scanner 33, APC intensity and the emission intensity at detection are separately decided. Here, the timing control signal is a signal which is input from the exposure control circuit 15 to the laser drive circuit 16 for light emission of the laser beam source 11 at the emission intensity at detection.

In addition, in the present embodiment, the emission intensity at detection is decided as an emission intensity P2 (see FIGS. 4 and 6), while the magnitude of electrical current used for the light emission of the laser diode 111 at the emission intensity P2 is a known value.

As shown in FIG. 6, the input voltage Vi from the photodiode 141 varies according to the emission intensity of a laser beam emitted from the laser beam source 11. Additionally, FIGS. 6(*a*) to (*c*) show BD signals output from the laser sensor 14 when the emission intensities of the laser beam source 11 are P1, P2 and P3. The emission intensities P1, P2 and P3 are: the emission intensity P1<the emission intensity P2<the emission intensity P3.

As illustrated in FIG. 6, the higher the emission intensity of the laser beam source 11 is, the higher the peak value of the input voltage Vi in the laser sensor 14 reaches, and thus, the point of time when the input voltage Vi reaches the reference voltage Vr comes earlier. The output timings (t31, t32, and t33) of the BD signal from the laser sensor 14 therefore come earlier. In addition, the higher the emission intensity of the laser beam source 11 is, the longer the time interval during which the input voltage Vi is reaching the reference voltage Vr extends. The stop timings (t41, t42, and t43) of BD signals output from the laser sensor 14 therefore delay.

And thus, in the color printer X, when changing an emission intensity of a laser beam for forming an electrostatic latent image on the photoreceptor drum 31, by changing the APC intensity in conformity to the change of print conditions such as, for example, the resolution of image formation and printing speed, a writing timing in the main scanning direction of an electrostatic latent image onto the photoreceptor drum 31, that is to be controlled by the timing of the BD signal, might be changed.

Then, the later-described exposure processing, that is to be executed in the optical scanner 33 provided in the color printer X according to the embodiment of the present invention, controls so that a detection timing of a laser beam by the laser sensor 14, in short, an output timing of BD signal becomes constant. This keeps a writing timing of an electrostatic latent image in the main scanning direction onto the photoreceptor drum 31 to be constant.

In what follows, as referring now to the timing chart in FIG. 4, the exposure processing executed in the optical scanner 33 is described. FIG. 4 shows the exposure processing executed for every line of image data in the optical scanner 33 in time-series order (t1 to t6). In the optical scanner 33, with repetitive execution of the exposure processing to be described here, an electrostatic latent image of the entire manuscript image based on an image data is formed on the photoreceptor drum 31.

In FIG. 4, (a) is a BD signal, (b) is an APC control signal, (c) is an light emission control signal, (d) is a timing control signal, (e) is a light emitting state of the laser beam source 11 when the APC intensity is the emission intensity P2, (f) is a light emitting state of the laser beam source 11 when the APC intensity is the emission intensity P1, (g) is a light emitting state of the laser beam source 11 when the APC intensity is the emission intensity P3.

As shown in FIG. 4, the present exposure processing is roughly classified into: an APC control process (t1 to t2) wherein the APC control is executed, a timing adjustment process (t2 to t4) wherein the laser beam detection by the laser sensor 14 is executed, and an electrostatic latent image formation process (t5 to t6) for forming an electrostatic latent image based on image data onto the photoreceptor drum 31. Additionally, the present invention can be regarded as an image forming method for executing each process in the present exposure processing.

In the optical scanner 33, an image data is transmitted to the exposure control circuit 14 from the image processing unit 2 by the controller 6, and then the present exposure processing starts on condition that the polygon mirror 12 is in a stationary rotation state (in a state where the rotation is stable).

Here, the image data includes the information about the setting value of the APC intensity, while the exposure control circuit 15 changes the APC intensity in the laser drive circuit 16 based on the information. As mentioned, in the optical scanner 33, a change in the APC intensity changes the emission intensity of the laser beam source 11 at the time of the electrostatic latent image formation onto the photoreceptor drum 31. Here, the exposure control circuit 15 at the time of performing this changing processing of the APC intensity corresponds to an exposure intensity changing unit.

In what follows, after explaining the exposure processing in a case where the APC intensity is set to the emission intensity P2, the exposure processing in a case where the APC intensity is set to the emission intensities P1 and P3 (see FIGS. 4 and 6) is explained. As mentioned above, the emission intensity at detection is decided as the emission intensity P2.

<APC Control Process>

Firstly, the exposure control circuit 15 inputs the APC control signal into the laser drive circuit 16 (t1 in FIG. 4(*b*)). This allows, in the laser drive circuit 16, the APC control for adjusting the magnitude of electrical current flowing to the laser diode 111 to be executed (t1 to t2 in FIG. 4), so that the emission intensity of a laser beam emitted from the laser beam source 11 settles to the emission intensity P2.

After that, when a prescribed time has passed since the start of the APC control, the input of the APC control signal from the exposure control circuit 15 to the laser drive circuit 16 is stopped (t2 in FIG. 4(*b*)). In response to this, the laser drive circuit 16 ends the APC control.

In this moment, the laser drive circuit 16 records the ending state of the APC control, more particularly, a current value required for the light emission of the laser diode 111 at the emission intensity P2, into a prescribed recording memory (not shown). In addition, the prescribed recording memory is provided in the exposure control circuit 15 and the laser drive circuit 16.

Here, the timing for the exposure control circuit 15 to start or stop inputting the APC control signal into the laser drive circuit 16 can be understood as when a preset prescribed time has passed since the above-mentioned outputting of BD signal from the laser sensor 14, and the end of the outputting of image data of the previous line. Particularly, the stop inputting timing of the APC control signal is at least before the timing understood as the incident timing of a laser beam from the laser beam source 11 to the laser sensor 14, and is set with a certain level of leeway. This allows the present APC control process to be ended at least before a laser beam becomes incident to the laser sensor 14.

<Timing Adjustment Process>

When the input of the APC control signal into the laser drive circuit 16 is stopped (t2 in FIG. 4(b)), the exposure control circuit 15 subsequently outputs the light emission control signal and the timing control signal to the laser drive circuit 16 (t2 to t4 in FIGS. 4(c) and (d)). In response to this, the laser diode 111 in the laser drive circuit 16 executes light emission during the input of the light emission control signal and the timing control signal (t2 to t4 in FIG. 4(e)).

In this moment, both the light emission control signal and the timing control signal are input in the laser drive circuit 16. Therefore, the magnitude of electrical current to be supplied to the laser diode 111 by the laser drive circuit 16 is a value required for light emission of the laser diode 111 at the emission intensity P2 as the emission intensity at detection. In short, the emission intensity of a laser beam from the laser beam source 11 in the present timing adjustment process is always the emission intensity P2.

A laser beam of the emission intensity P2 emitted form the laser beam source 11 and scanned by the polygon mirror 12 then begins to be incident to the laser sensor 14 at certain timing.

Here, when the input voltage Vi reaches to the reference voltage Vr or higher in the laser sensor 14, a BD signal is output from the laser sensor 14 to the exposure control circuit 15 (t3 in FIG. 4(a)).

After that, when the input voltage Vi lowers below the reference voltage Vr in the laser sensor 14, the BD signal being input in the exposure control circuit 15 from the laser sensor 14 is stopped (t4 in FIG. 4(a)). In response to this, the exposure control circuit 15 stops inputting the light emission control signal and the timing control signal into the laser drive circuit 16 (t4 in FIGS. 4(c) and (d)).

<Electrostatic Latent Image Formation Process>

When a prescribed time has passed since the stop (or the input) of the BD signal from the laser sensor 14, the exposure control circuit 15 then outputs the light emission control signal based on an image data to the laser drive circuit 16 (t5 to t6 in FIG. 4(c)). This allows, in the laser drive circuit 16, the existence of light emission of the laser diode 111 to be controlled according to ON/OFF of the light emission control signal, thereby forming an electrostatic latent image based on the image data on the photoreceptor drum 31.

Here, only the light emission control signal from the exposure control circuit 15 is input in the laser drive circuit 16, while the timing control signal is not input therein. The magnitude of electrical current to be supplied to the laser diode 111 in the laser drive circuit 16 is therefore a value required for light emission of the laser diode 111 at the APC intensity. The APC intensity here is set to the emission intensity P2.

In addition, the magnitude of electrical current to be supplied to the laser diode 111 is read out from a prescribed recording memory (not shown) in which the ending state of the APC control process is recorded. This allows the emission intensity of a laser beam from the laser beam source 11 in the present electrostatic latent image formation process to be the same as the APC intensity adjusted in the APC control process. Also, a method for recording the electrical current value into the prescribed recording memory at the time of ending the APC control is explained. However, for example, two paths: a power supply path for the APC intensity and a power supply path for the light emission intensity at detection, may be provided as a power supply path to the laser diode 111 to be switched between.

Next, a case is explained where a setting value of the APC intensity in the laser drive circuit 16 is set to the emission intensity P1 which is lower than the emission intensity P2, since, for example, the printing speed is set to a value lower than normal. Additionally, the explanation of processing similar to the above-mentioned exposure processing is omitted.

In the APC control process, the magnitude of electrical current flowing to the laser diode 111 is adjusted so that the emission intensity of a laser beam from the laser beam source 11 settles to the emission intensity P1 as the APC intensity, and its value is recorded in a prescribed recording memory (t1 to t2 in FIG. 4(f)).

After the end of the APC control process, as mentioned, the light emission control signal and the timing control signal are then input from the exposure control circuit 15 into the laser drive circuit 16 in the timing adjustment process. This allows, in the laser drive circuit 16, the electrical current having a magnitude required for light emission of the laser diode 111 at the emission intensity P2 to be supplied to the laser diode 111 (t2 to t4 in FIG. 4(f)). In short, the emission intensity of the laser diode 111 is changed from the emission intensity P1 to the emission intensity P2.

After that, when a laser beam is detected by the laser sensor 14 so that a BD signal is output from the laser sensor 14 (t3 in FIG. 4(a)), the exposure control circuit 15 then, after a prescribed time has passed since the stop (or the input) of the BD signal, outputs the light emission control signal to the laser drive circuit 16 on the basis of image data (t5 in FIG. 4(c)). Here, only the light emission control signal is input in the laser drive circuit 16, and thus, the laser diode 111 performs light emission at the emission intensity P1 as the APC intensity (t5 to t6 in FIG. 4(f)). In short, when forming an electrostatic latent image on the photoreceptor drum 31, the emission intensity of the laser diode 111 is changed from the emission intensity P2 to the emission intensity P1 as the APC intensity.

On the other hand, in a case where a setting value of the APC intensity in the laser drive circuit 16 is set to the emission intensity P3 which is higher than the emission intensity P2, since, for example, the printing speed is set to a value lower than normal, the magnitude of the electrical current flowing to the laser diode 111 is adjusted in the APC control process, so that the emission intensity of a laser beam from the laser beam source 11 settles to the emission intensity P3 as the APC intensity, and the adjusted value is then recorded in the prescribed recording memory (t1 to t2 in FIG. 4(g)).

After the end of the APC control process, as mentioned, the light emission control signal and the timing control signal are then input from the exposure control circuit 15 into the laser drive circuit 16 in the timing adjustment process. This allows, in the laser drive circuit 16, the electrical current having a magnitude required for light emission of the laser diode 111 at the emission intensity P2 to be supplied to the laser diode 111 (t2 to t4 in FIG. 4(g)). In short, the emission intensity of the laser diode 111 is changed from the emission intensity P3 to the emission intensity P2.

After that, when a laser beam is detected by the laser sensor 14 so that a BD signal is output from the laser sensor 14 (t3 in FIG. 4(a)), the exposure control circuit 15 then, after a prescribed time has passed since the stop (or the input) of the BD signal, outputs the light emission control signal to the laser drive circuit 16 on the basis of image data. Here, only the light emission control signal is input in the laser drive circuit 16. Therefore, the laser diode 111 performs light emission at the emission intensity P3 as the APC intensity (t5 to t6 in FIG. 4(f)). In short, the emission intensity of the laser diode 111 is changed from the emission intensity P2 to the emission intensity P3.

As described above, in the optical scanner 33, even when the change in a setting value of the APC intensity changes the emission intensity of a laser beam emitted from the laser beam source 11 in the APC control process and the electrostatic latent image formation process, the emission intensity at detection is always kept constant at the emission intensity P2. Accordingly, in the timing adjustment process, a laser beam of a constant emission intensity is emitted from the laser beam source 11 regardless of the APC intensity. The detection timing of a laser beam by the laser sensor 14 does not therefore deviate. Here, in the timing adjustment process, the exposure control circuit 15 and the laser drive circuit 16 at a time when the emission intensity of the laser beam source 11 at the time of the incidence to the laser sensor 14 always acts so as to be set to the emission intensity at detection corresponds to a setting unit for emission intensity at detection.

This allows the position of the electrostatic latent image formation in the main scanning direction to the photoreceptor drum 31 to be held constant in the optical scanner 33. And therefore, in the color printer X, even when the APC intensity in the optical scanner 33 is individually changed for each of the image forming units 3M, 3C, 3Y, and 3K, the position in the main scanning direction of an electrostatic latent image on the photoreceptor drum 31 in each of the image forming units 3M, 3C, 3Y, and 3K does not change. Consequently, color deviation of a color image formed by overlapping these images can be prevented.

However, in the optical scanner 33, the aging degradation of each device in the laser beam source 11 may cause a deviation in the correspondence relationship between the magnitude of the electrical current flowing to the laser diode 111 and the emission intensity of the laser diode 111. Therefore, when an constant magnitude of an electrical current is flowing in the timing adjustment process, the emission intensity of the laser diode 111 might not consistently settle to the emission intensity at detection.

In response, the magnitude of the electrical current to be supplied to the laser diode 111 in the timing adjustment process may be decided by a calculation based on the current value adjusted in the APC control process.

In particular, the APC control process may comprise the execution of APC control by applying a prescribed control voltage to the laser diode 111.

Here, when the emission intensity at detection is 9 mW and the APC intensity is 12 mW, the current value adjusted with a control voltage 1.2V applied in the APC control process is supposedly 12 mA. In this case, in order to obtain the emission intensity at detection of 9 mW, a control voltage to be applied in the APC control process may be 0.9V, which is obtained by multiplying 1.2 by 9/12. In this moment, the electrical current 9 mA obtained by multiplying 9/12 by 12 mA, which is a current value adjusted in the APC control process, is supplied to the laser diode 111.

And also, when the emission intensity at detection is 9 mW and the APC intensity is 6 mW, the current value adjusted with a control voltage 0.6V applied in the APC control process is supposedly 6 mA. In this case, in order to obtain the emission intensity at detection of 9 mW, a control voltage to be applied in the APC control process may be 0.9V, which is obtained by multiplying 1.2 by 9/6. In this moment, the electrical current 9 mA obtained by multiplying 9/6 by 6 mA, which is a current value adjusted in the APC control process, is supplied to the laser diode 111.

As mentioned, when each current value to be supplied to the laser diode 111 is decided by a calculation based on a current value adjusted in the APC control process so as to obtain a predetermined emission intensity at detection, the laser beam can be emitted to the laser sensor 14 at the constant emission intensity at detection in the timing adjustment process, and thereby preventing the deviation of detection timing of a laser beam by the laser sensor 14.

What is claimed is:

1. An optical scanner comprising:
a laser beam source for emitting a laser beam;
an optical scanning device for scanning a laser beam emitted from the laser beam source;
an exposure controller for forming an electrostatic latent image corresponding to image data on a photoreceptor by controlling light emission of the laser beam source on the basis of the image data;
a laser beam detector which is provided in a predetermined position on a scanning path of a laser beam scanned by the optical scanning device and which detects when the laser beam has an emission intensity equal to or higher than a predetermined reference emission intensity;
an exposure-start timing controller for controlling a start timing of formation of an electrostatic latent image by the exposure controller on the basis of a time at which the laser beam is detected by the laser beam detector;
an exposure intensity changing unit for changing an emission intensity of the laser beam source at the time of electrostatic latent image formation;
an emission intensity setting unit for setting the emission intensity at detection of the laser beam source at a time when a laser beam is detected by the laser beam detector to a predetermined constant emission intensity irrespective of a change in beam emission intensity effected by the exposure intensity changing unit at the time of electrostatic latent image formation; and
an automatic emission intensity adjusting unit for automatically adjusting an emission intensity of the laser beam source to a preset automatically-adjusted emission intensity, wherein
the exposure intensity changing unit changes the emission intensity of the laser beam source at the time of electrostatic latent image formation by the exposure controller, by changing a setting value of the automatically-adjusted emission intensity of the automatic emission intensity adjusting unit,
the emission intensity setting unit at detection changes an emission intensity of the laser beam source to the emission intensity at detection after the end of adjustment by the automatic emission intensity adjusting unit, and
the exposure intensity changing unit changes the emission intensity of the laser beam source to the automatically-adjusted emission intensity adjusted by the automatic emission intensity adjusting unit when the exposure controller starts the electrostatic latent image formation according to the laser beam detection by the laser beam detector, thereby a position of an electrostatic latent image formed on the photoreceptor in a main scanning direction is held constant.

2. The image forming apparatus comprising one or a plurality of the optical scanners according to claim 1.

3. An image forming method employing an optical scanner comprising:
   a laser beam source for emitting a laser beam;
   an optical scanning device for scanning a laser beam emitted from the laser beam source;
   an exposure controller for forming an electrostatic latent image corresponding to image data on a photoreceptor by controlling light emission from the laser beam source on the basis of the image data;
   a laser beam detector that is provided in a predetermined position on a scanning path of a laser beam scanned by the optical scanner and which detects when the laser beam has an emission intensity equal to or higher than a predetermined reference emission intensity;
   an exposure-start timing controller for controlling a start timing of electrostatic latent image formation by the exposure controller on the basis of a time at which the laser beam is detected by the laser beam detector;
   an exposure intensity changing unit for changing the emission intensity of the laser beam source at the time of electrostatic latent image formation by the exposure controller; and
   an automatic emission intensity adjusting unit for automatically adjusting an emission intensity of the laser beam source to a preset automatically-adjusted emission intensity,
   said image forming method comprising steps of:
   setting the emission intensity of the laser beam source at a time of detection of the laser beam by the laser beam detector to a predetermined constant emission intensity at detection, irrespective of a change in emission intensity of the beam effected by the exposure intensity changing unit at the time of electrostatic latent image formation;
   changing the emission intensity of the laser beam source to the emission intensity at detection after the end of adjustment by the automatic emission intensity adjusting unit,
   changing the emission intensity of the laser beam source to the automatically-adjusted emission intensity adjusted by the automatic emission intensity adjusting unit when the exposure controller starts the electrostatic latent image formation according to the laser beam detection by the laser beam detector, and
   thereby holding a position of the electrostatic latent image formed on the photoreceptor in a main scanning direction constant.

4. The image forming method according to claim 3 employing one or a plurality of said optical scanners.

5. An optical scanner comprising:
   a laser beam source for emitting a laser beam;
   an optical scanning device for scanning a laser beam emitted from the laser beam source;
   a laser beam detector which is provided in a predetermined position on a scanning path of a laser beam scanned by the optical scanning device and which detects when the laser beam has an emission intensity equal to or higher than a predetermined reference emission intensity;
   an exposure control unit for forming an electrostatic latent image corresponding to image data on a photoreceptor by controlling light emission of the laser beam source on the basis of the image data, the exposure control unit controlling a start time of electrostatic latent image formation based on a time at which the laser beam is detected by the laser beam detector, and changing an emission intensity of the laser beam source at the time of electrostatic latent image formation; and
   a laser drive unit for setting the emission intensity at detection of the laser beam source at the time that the laser beam detector detects the beam to a predetermined constant emission intensity irrespective of a change in beam emission intensity effected by the exposure control unit at the time of electrostatic latent image formation, and for automatically adjusting the emission intensity of the laser beam source to a preset automatically-adjusted emission intensity, wherein
   the exposure control unit changes the emission intensity of the laser beam source at the time of electrostatic latent image formation by changing a setting value of the automatically-adjusted emission intensity of the laser drive unit,
   the laser drive unit, at detection, changes an emission intensity of the laser beam source to the emission intensity at detection after the end of adjustment, and
   the laser drive unit changes the emission intensity of the laser beam source to the adjusted automatically-adjusted emission intensity when the exposure control unit starts electrostatic latent image formation according to the laser beam detection by the laser beam detector,
   whereby a position of an electrostatic latent image formed on the photoreceptor in a main scanning direction is held constant.

6. The image forming apparatus comprising one or a plurality of the optical scanners according to claim 5.

* * * * *